United States Patent
Tabuki

(10) Patent No.: US 10,379,797 B2
(45) Date of Patent: Aug. 13, 2019

(54) IMAGE FORMING APPARATUS THAT NOTIFIES A SERVER, BASED ON DATA SIZE INFORMATION, WHETHER A PORTABLE DOCUMENT FORMAT IS SUPPORTED, AND RELATED METHOD OF CONTROLLING PRINTING AND PRINTING SYSTEM

(71) Applicant: CANON KABUSHIKI KAISHA, Tokyo (JP)

(72) Inventor: Masumi Tabuki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/006,799

(22) Filed: Jan. 26, 2016

(65) Prior Publication Data
US 2016/0231970 A1   Aug. 11, 2016

(30) Foreign Application Priority Data
Feb. 6, 2015 (JP) .................................. 2015-022347

(51) Int. Cl.
*G06F 3/12* (2006.01)
*H04N 1/00* (2006.01)

(52) U.S. Cl.
CPC .......... *G06F 3/1255* (2013.01); *G06F 3/1206* (2013.01); *G06F 3/1207* (2013.01);
(Continued)

(58) Field of Classification Search
None
See application file for complete search history.

(56) References Cited

U.S. PATENT DOCUMENTS 6,028,676 A   2/2000 Nakao
8,891,104 B2  11/2014 Ikeda
(Continued)

FOREIGN PATENT DOCUMENTS

JP   H07-121320 A   5/1995
JP   H10-187371 A   7/1998
(Continued)

OTHER PUBLICATIONS

PWG Raster Format (Apr. 20, 2012) ftp://ftp.pwg.org/pub/pwg/candidates/cs-ippraster10-20120420-5102.4.pdf.*
(Continued)

*Primary Examiner* — Huo Long Chen
(74) *Attorney, Agent, or Firm* — Venable LLP

(57) ABSTRACT

An image processing apparatus has a notification unit that initially provides a notification indicating that both of a Portable Document Format (PDF) format and a format that is different from the PDF format are supported, wherein the image processing apparatus waits for receipt of complete print data of a print job in the PDF format before performing image processing, and the image processing apparatus is capable of starting the image processing before receipt of complete print data of a print job in the format that is different from the PDF format, and to provide, after obtaining data size information, an updated notification to a server in a case in which the obtained data size information indicates a data size that is greater than a predetermined size. The updated notification is used to identify that the PDF format is not supported, but a format that is different from the PDF format is supported.

15 Claims, 12 Drawing Sheets

(52) U.S. Cl.
CPC .......... *G06F 3/1232* (2013.01); *G06F 3/1287* (2013.01); *G06F 3/1292* (2013.01); *H04N 1/00244* (2013.01); *G06F 3/1247* (2013.01); *H04N 2201/0094* (2013.01)

(56) References Cited

U.S. PATENT DOCUMENTS

| | | | |
|---|---|---|---|
| 9,092,703 B2 | 7/2015 | Kamoi | |
| 2004/0100656 A1* | 5/2004 | Kuroki | G06F 3/1205 358/1.16 |
| 2008/0137137 A1* | 6/2008 | Yamada | H04N 1/00408 358/1.15 |
| 2009/0089533 A1* | 4/2009 | Nogawa | G06F 3/1213 711/171 |
| 2011/0038006 A1* | 2/2011 | Sato | H04N 1/00347 358/1.15 |
| 2011/0194140 A1* | 8/2011 | Sweet | G06F 3/1204 358/1.15 |
| 2013/0100480 A1* | 4/2013 | Ikeda | G06K 15/1822 358/1.14 |
| 2013/0155457 A1* | 6/2013 | Miura | G06F 3/1296 358/1.15 |
| 2015/0002884 A1* | 1/2015 | Okumura | G06F 3/1203 358/1.14 |
| 2016/0028911 A1* | 1/2016 | Morita | H04N 1/00 358/1.15 |
| 2016/0094727 A1* | 3/2016 | Sawada | H04N 1/3935 358/1.15 |
| 2016/0134764 A1* | 5/2016 | Oguma | G06F 3/1239 358/1.14 |

FOREIGN PATENT DOCUMENTS

| | | | | |
|---|---|---|---|---|
| JP | 2002-244823 A | | 8/2002 | |
| JP | 2004-287763 A | | 10/2004 | |
| JP | 2008-147988 A | | 6/2008 | |
| JP | 2010-006034 A | | 1/2010 | |
| JP | 2013-092886 A | | 5/2013 | |
| JP | 2013-103477 A | | 5/2013 | |
| JP | 2016072785 A | * | 5/2016 | .......... H04N 1/3935 |

OTHER PUBLICATIONS

"PWG-Raster Format" The Printer Working Group (URL:ftp://ftp.pwg.org/pub/pwg/candidates/cs-ippraster10-20120420-5102.4.pdf), pp. 1-40, Apr. 20, 2012.

Office Action dated Oct. 1, 2018, issued in Japanese Patent Application No. 2015-022347.

* cited by examiner

| CLOUD PRINT SERVICE: PRINTER REGISTRATION | | |
|---|---|---|
| ⦿ PRINTER NAME | IP ADDRESS | RE-SEARCH FOR PRINTER |
| ○ PRINTER NAME | IP ADDRESS | REGISTRATION OF PRINTER |
| ○ PRINTER NAME | IP ADDRESS | |
| ○ PRINTER NAME | IP ADDRESS | CANCEL |

FIG. 10

◆ EXAMPLE INDICATING THAT IMAGE FORMING APPARATUS 1 SUPPORTS TWO FORMATS: PDF AND RASTER

```
"printer":{
        "supported_content_type":{
            {"content_type":"application/pdf"}
            {"content_type":"image/pwg-raster"}
        }

"supported_resolution":{
            {"horizontal resolution":1200dpi },
            {"Vertical resolution"   :1200dpi }
        }
    }
```

FIG. 11

◆ EXAMPLE INDICATING THAT IMAGE FORMING APPARATUS 1 SUPPORTS ONLY THE RASTER FORMAT

```
"printer":{
        "supported_content_type":{
            {"content_type":"image/pwg-raster"}
        }

"supported_resolution":{
            {"horizontal resolution":300dpi },
            {"Vertical resolution"   :300dpi }
        }
    }
```

F I G. 12

◆ EXAMPLE OF JOB ID OBTAINED BY FETCH(LIST)

```
"print Job": {
  "job_id":"0001",
  "job_type":"application/pdf",
  "job_size":33888,
  "job_name":"Print Doc.pdf"
  "fileUrl":"http://www.cloudprint.com¥download?id\1303E14A-6A49-4944-9AAB-1A1BBC2B9D7E"
}
```

F I G. 13

◆ EXAMPLE OF JOB TICKET

```
"job Ticket":{
  color = 2;
  duplex = 3;
  page_orientation = 4;
  copies = 5;
  media_size = 10;
}
```

IMAGE FORMING APPARATUS THAT NOTIFIES A SERVER, BASED ON DATA SIZE INFORMATION, WHETHER A PORTABLE DOCUMENT FORMAT IS SUPPORTED, AND RELATED METHOD OF CONTROLLING PRINTING AND PRINTING SYSTEM

This application claims the benefit of Japanese Patent Application No. 2015-022347, filed Feb. 6, 2015, which is hereby incorporated by reference herein in its entirety.

BACKGROUND OF THE INVENTION

Field of the Invention

The present invention relates to an image forming apparatus, and, in particular, to an image forming apparatus that supports a cloud print service, the method of controlling printing by the image forming apparatus, a printing system, and a program.

Description of the Related Art

In recent years, image forming apparatuses that support a cloud print service on an office device, such as a copying machine or a printer, are increasing. A cloud print service is a technique that enables a user to access a cloud server, via a terminal, and to remotely print a file. At a time of printing, without the necessity of a printer driver at all, it is possible to transmit print data to various printers (regardless of printer manufacturer) directly from a desktop or mobile application, and through a general-purpose image format (for example, a data format defined by a standard specification, such as Portable Document Format (PDF), Printer Working Group Raster (PWG-RASTER), Joint Photographic Experts Group (JPEG)). A method of printing by switching, if a job that exceeds capabilities of an image forming apparatus is generated, a job obtainment path between the image forming apparatus and a cloud server (switching a data conversion server and changing an image format) to convert to a processable job and to print is proposed, as in Japanese Patent Laid-Open No. 2013-103477. Note that there is description of PWG-Raster in "PWG-Raster" (URL:ftp://ftp.pwg.org/pub/pwg/candidates/cs-ippraster10-20120420-5102.4.pdf).

While it is necessary for an image forming apparatus to know a server configuration of the cloud print service (a configuration of a print server, a print data conversion server, or the like) for the technique of Japanese Patent Laid-Open No. 2013-103477, however, there is a first problem in that this is difficult in reality.

In addition, there is a second problem in that the image forming apparatus lacks flexibility, in that, even with an approach that switches the information obtainment path, a need to fix a server address in system operation occurs.

Furthermore, with a PDF format, which is a general-purpose image format, a structural description necessary for interpreting a structure of data to be printed is described at the end of an electronic document. Accordingly, to interpret a PDF file, it is necessary to download the PDF file entirely. In a low-price device, or the like, that does not have an external storage device, such as a hard disk, however, it is necessary to limit a memory size for storage due to a restriction on a hardware memory capacity. Therefore, there is a third problem in that a file (a job) that exceeds an upper limit of a memory size must be cancelled, and printing cannot be performed.

SUMMARY OF THE INVENTION

The present invention provides an image forming apparatus that makes a document that could not be printed due to capabilities of the image forming apparatus printable, and a method of controlling printing by the image forming apparatus.

The present invention comprises the following configuration.

According to one aspect, the present invention provides an image forming apparatus connected to a server that generates job data in accordance with capability information of a registered image forming apparatus in accordance with a print request, and regenerates the job data in accordance with updated capability information in accordance with an update request, the apparatus comprising a comparing unit configured to compare a size of job data obtained from the server and a storage capacity of a storage for storing job data, an update requesting unit configured to transmit, to the server, the update request to cause the size of the job data to be reduced in a case in which the size of the job data is greater than the storage capacity, and an image forming unit configured to form an image based on the job data in a case in which the size of the job data is less than or equal to the storage capacity.

According to another aspect, the present invention provides a printing system comprising a server that, in accordance with a print request, generates job data in accordance with capability information of a registered image forming apparatus, and regenerates job data in accordance with capability information updated in accordance with an update request, and an image forming apparatus connected to the server, the apparatus comprising a comparing unit configured to compare a size of job data obtained from the server and a storage capacity of a storage for storing job data, an update requesting unit configured to transmit, to the server, the update request to cause the size of the job data to be reduced in a case in which the size of the job data is greater than the storage capacity, and an image forming unit configured to form an image based on the job data in a case in which the size of the job data is less than or equal to the storage capacity.

By virtue of the present invention, it becomes possible to print a document that could not be printed due to capabilities of the image forming apparatus.

Further features of the present invention will become apparent from the following description of exemplary embodiments with reference to the attached drawings.

BRIEF DESCRIPTION OF THE DRAWINGS

FIG. 10 is a view for illustrating one example of capability information that the image forming apparatus 1 illustrated in FIG. 6 sends to the cloud server 2 or the terminal 3.

FIG. 11 is a view for illustrating one example of capability information that, in step S2018 and step S2020 illustrated in FIGS. 9A and 9B, the image forming apparatus 1 sends to the cloud server 2 or the terminal 3 to lower a function.

FIG. 12 is a view for illustrating an example of job information exchanged in C1005 in FIG. 6 and C2004 in FIG. 14.

FIG. 13 is a view for illustrating an example of a job ticket exchanged in C1007 in FIG. 6 and C2006 in FIG. 14.

DESCRIPTION OF THE EMBODIMENTS

Cloud Print System

Figure 1:
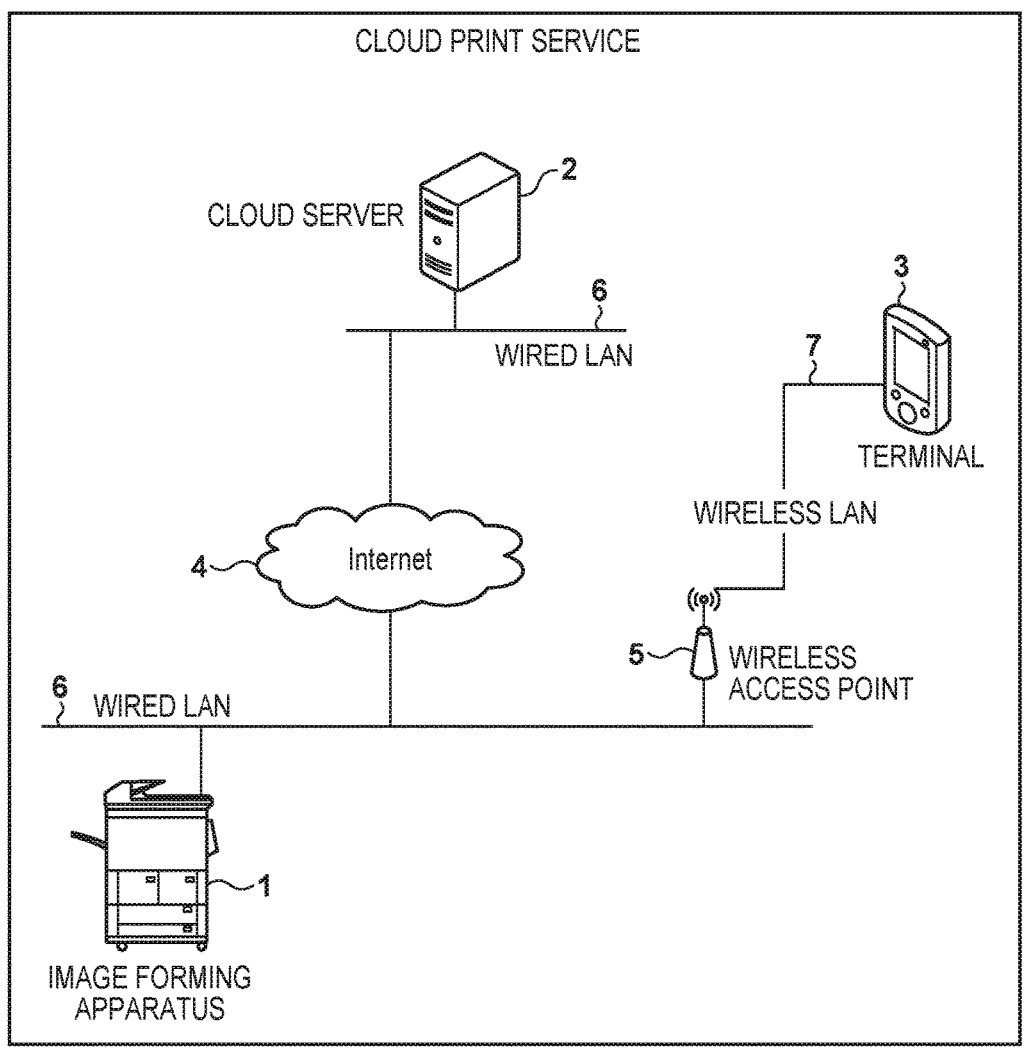
FIG. 1 is a schematic view for illustrating an environment in which an image forming apparatus (i.e., a multi-function peripheral (MFP)) is used according to a present embodiment.

Below, an explanation of a configuration for implementing the present invention is given using the figures. FIG. 1 is a view for illustrating an example configuration of a printing system of a cloud print service according to the present embodiment. The cloud print service comprises of a cloud server 2, a mobile terminal 3 (hereafter, referred to as the terminal 3), and an image forming apparatus 1.

The terminal 3 is connected to a wireless access point 5 via a wireless local area network (LAN) 7. Each apparatus is connected to the Internet 4 via a wired LAN 6. Note that, in the present embodiment, a configuration is made to comprise one cloud server 2, but a plurality of cloud servers may be comprised, and a plurality of servers may realize a later-described cloud print service of FIG. 3. In such a case, a plurality of servers may be on the same LAN, or may be arranged on different LANs and connected through the Internet 4. Also, the apparatuses configuring the cloud print service are capable of being connected through the Internet 4 and can perform data communication with each other. Furthermore, the terminal 3 and the image forming apparatus 1 may be capable of directly connecting by a short range communication medium without passing through the Internet 4. Also, a plurality of terminals or a plurality of image forming apparatuses.

Image Forming Apparatus

Figure 2:
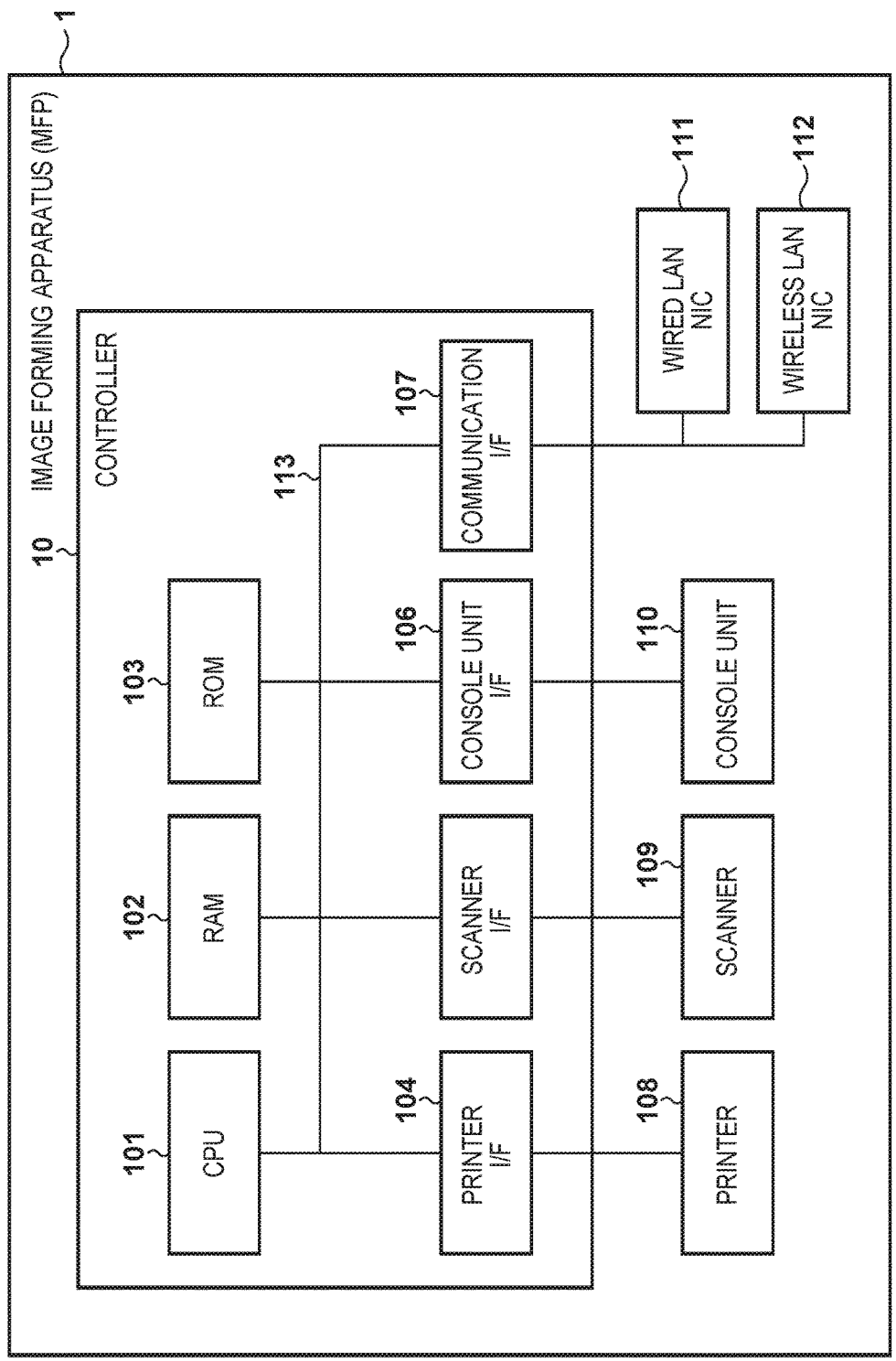
FIG. 2 is a block diagram for illustrating a hardware configuration of the image forming apparatus 1 illustrated in FIG. 1.

FIG. 2 is a block diagram for illustrating an example of the hardware configuration of the image forming apparatus 1 functioning as the image processing apparatus of the present embodiment. The image forming apparatus 1 is, for example, a digital multi-function peripheral (MFP), and comprises a controller 10. The controller 10 comprises a central processing unit 101, a random-access memory (RAM) 102, a read only memory (ROM) 103, a printer interface (I/F) 104, a scanner I/F 105, a console unit I/F 106, and a communication I/F 107. Also, the image forming apparatus 1 comprises a printer 108, a scanner 109, a console unit (operation unit) 110, and network interface controllers (NICs), such as a wired LAN NIC 111 and/or a wireless LAN NIC 112.

The CPU 101 controls an overall operation of the image forming apparatus 1. The CPU 101 comprehensively controls each device connected to a system bus 113 in accordance with a program stored in the ROM 103. The RAM 102 functions as a main memory, a work area, or the like, for the CPU 101, and is used as a storage region for image information. In addition, the RAM 102 also comprises a non-volatile RAM (NVRAM) region, and is configured so that reprinting can be performed easily in a case in which a power OFF occurs suddenly in the process of a print execution by the cloud print service.

The ROM 103 stores various fonts, control programs, or the like, executed by the CPU 101, as well as various data. The printer I/F 104 controls an interface to the printer 108, which is a printer engine. The scanner I/F 105 controls an interface to the scanner 109, which is a scanner engine.

The console unit I/F 106 controls an interface to the console unit 110 for performing various setting of the image forming apparatus 1. The communication I/F 107 controls a communication of an NIC, such as the wired LAN NIC 111 or the wireless LAN NIC 112. The wired LAN NIC 111 and the wireless LAN NIC 112 are connection I/Fs to the wired LAN 6 or the wireless LAN 7, and control data transmission and reception with the cloud server 2 or the terminal 3. The communication I/F 107 comprises an implementation suitable for an execution environment, such as a web service protocol.

The CPU 101 reads out a program stored in the ROM 103, or the like, to the RAM 102, as necessary, and executes it, but a program recorded in the cloud server 2 may be loaded to the RAM 102 and the CPU 101 may execute the program. Also, the image forming apparatus 1 may comprise a configuration for a short range communication function (not shown) in order to perform direct communication with the terminal 3.

Server and Terminal

Figure 3:
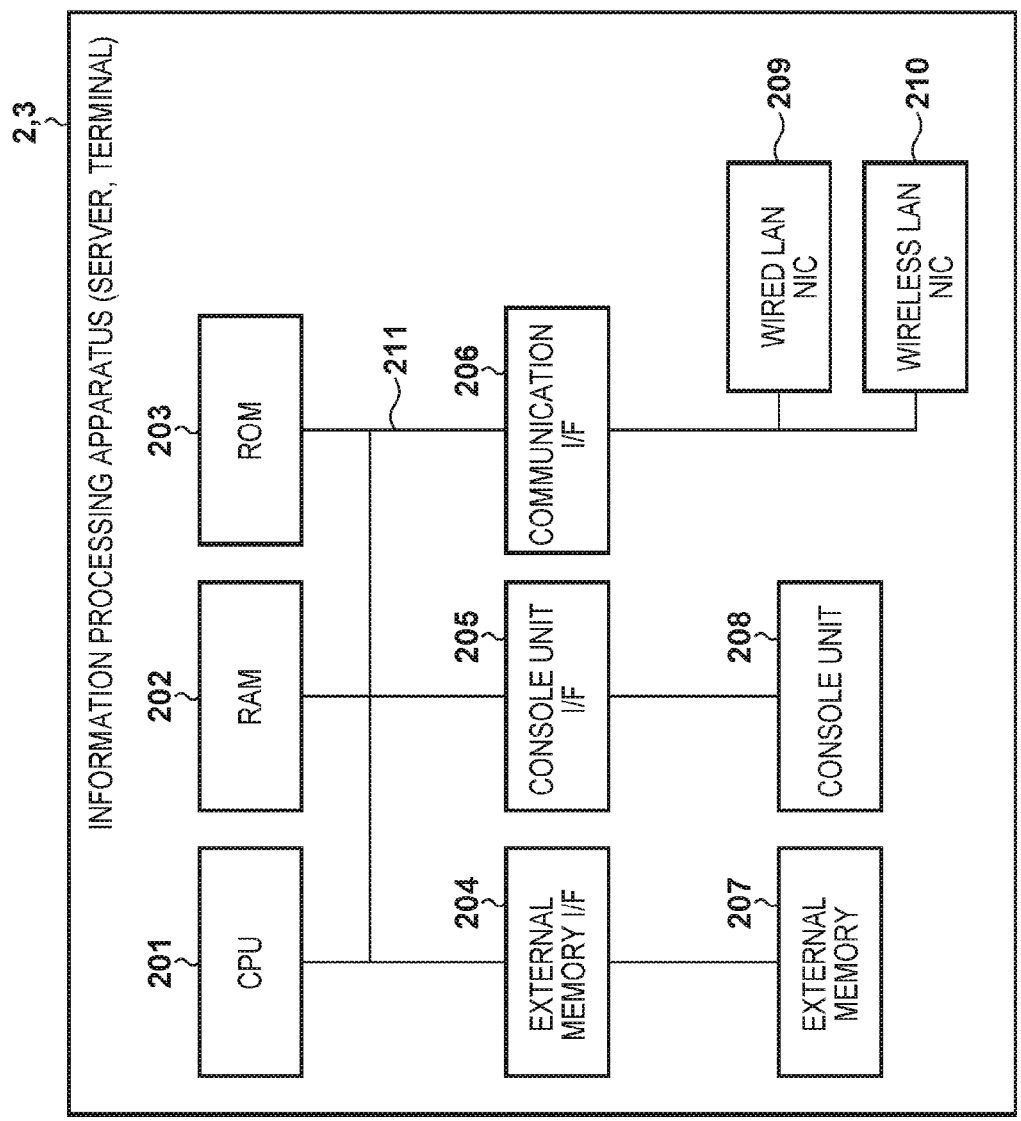
FIG. 3 is a block diagram for illustrating a hardware configuration of a cloud server 2 and a terminal 3 illustrated in FIG. 1.

FIG. 3 is the block diagram for illustrating one example of the hardware configuration of the cloud server 2 and the terminal 3. The cloud server 2 and the terminal 3 comprise a CPU 201, a RAM 202, a ROM 203, an external memory I/F 204, a console unit I/F 205, and a communication I/F 206.

The CPU 201 comprehensively controls each device connected to a system bus 211 in accordance with a program stored in the ROM 202, which is a storage unit. The RAM 202 functions as a main memory, a work area, or the like, of the CPU 201. The ROM 203 stores various programs and data.

The external memory I/F 204 controls an access to, for example, a flash memory, a solid state disk (SDD), and an external memory 207, such as a hard disk, in the case of the server 2. The external memory 207 functions as a non-transitory computer-storable or a readable storage medium, and stores an operating system (OS), a Web browser, and an application. Programs of applications and each module (software) are stored in the external memory 207, read out to the RAM 202 as necessary, and executed by the CPU 201. With this, the functions of applications or each module (software) are realized.

The console unit I/F 205 controls an input from an operation unit 208. The communication I/F 206 controls a communication of an NIC, such as a wired LAN NIC 209 and/or a wireless LAN NIC 210. The wired LAN NIC 209 and the wireless LAN NIC 210 are connection I/Fs to the wired LAN 6 and the wireless LAN 7, and control data transmission and reception with the cloud server 2 or the terminal 3. The communication I/F 206 comprises an implementation suitable for an execution environment, such as a web service protocol. The configuration is such that processing explained in the present embodiment is capable of causing a program recorded in the external memory 207 to be loaded in the RAM 202 and executed by a CPU 111.

Note, the cloud server 2 and the terminal 3 may comprise either the wired LAN 209 or the wireless LAN 210. The cloud server 2 may be lacking the operation unit 208. If the terminal 3 is a mobile terminal, the communication medium may be only the wireless LAN 210, and the operation unit 208 may be a touch panel, or the like. Also, the terminal 3 may comprise a configuration for the short range communication function (not shown).

Image Forming Apparatus Software Configuration

Figure 4:
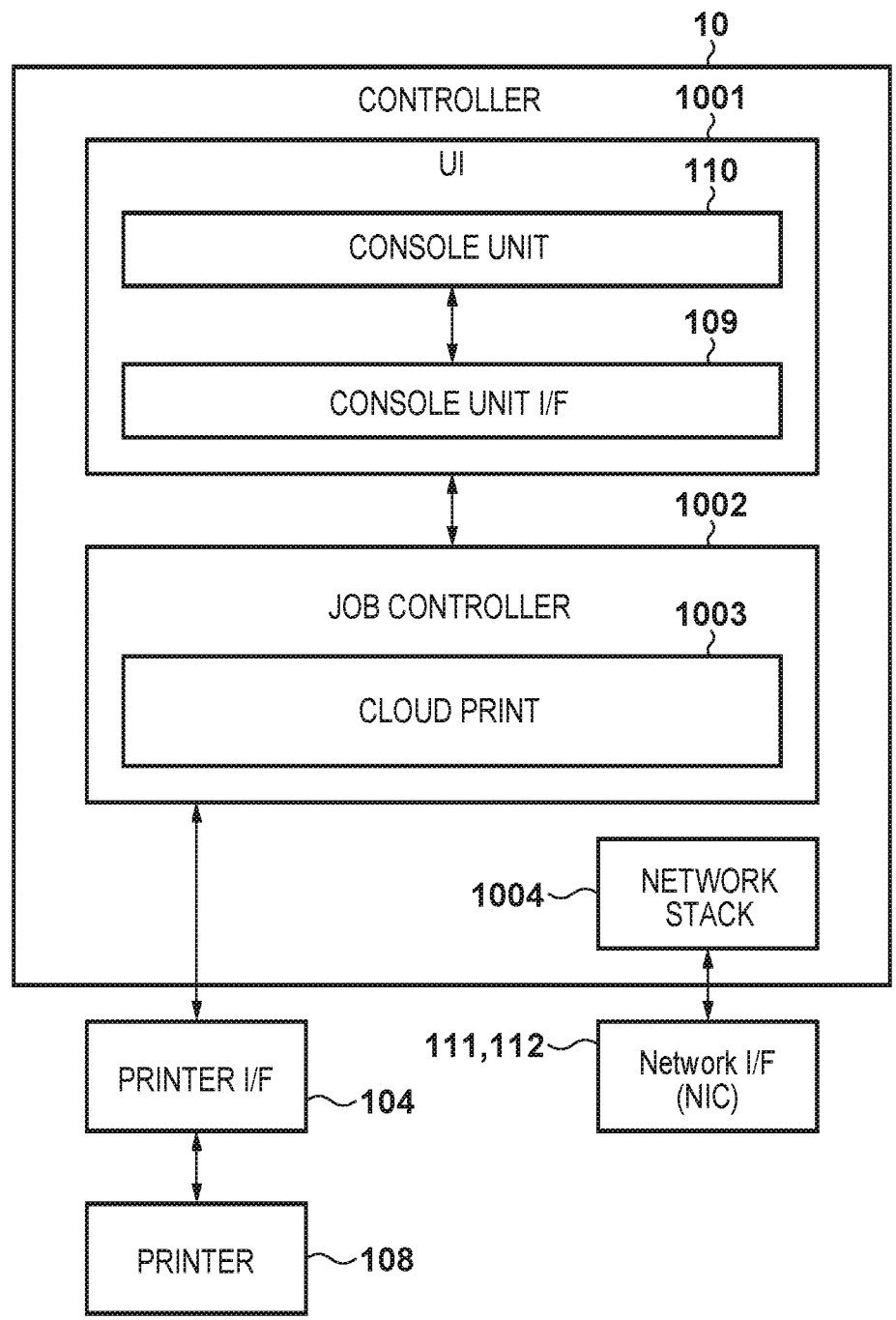
FIG. 4 is a block diagram for illustrating a software configuration of the image forming apparatus 1 illustrated in FIG. 1.

FIG. 4 is a block diagram for showing a controller 10 and the software of the image forming apparatus 1, and a functional configuration realized by these elements. The functions of the image forming apparatus 1 includes a user interface (UI) 1001 and a job controller 1002. The image forming apparatus 1 is equipped with a module of a network stack 1004. Furthermore, the job controller 1002 includes a task for a cloud print 1003. The cloud print 1003 executes registration of capability information to the cloud server 2, or print processing (refer to FIGS. 9A and 9B) in accordance with a job notification from the cloud server 2. Each module or task is configured from programs saved in the ROM 103, and in the implementation the programs are executed by being processed by the CPU 101.

Via the console unit 110, which is controlled by the console unit I/F 106, the UI 1001 performs input and output of various information necessary for control of the controller 10. The network stack 1004 performs control of network protocols starting with TCP/IP and including extensible messaging and presence protocol (XMPP), as well as hypertext transfer protocol (HTTP), and, via the Internet 4, realizes communication with the cloud server 2 or the terminal 3. The cloud print 1003 is a task that includes later-described print control processing, or the like. In accordance with a job notification received via the network I/F (NIC) 111 or 112, a later-described cloud print sequence is executed, and printing via the printer I/F 104 is caused to be performed by the printer 108.

Print Service

Figure 5:
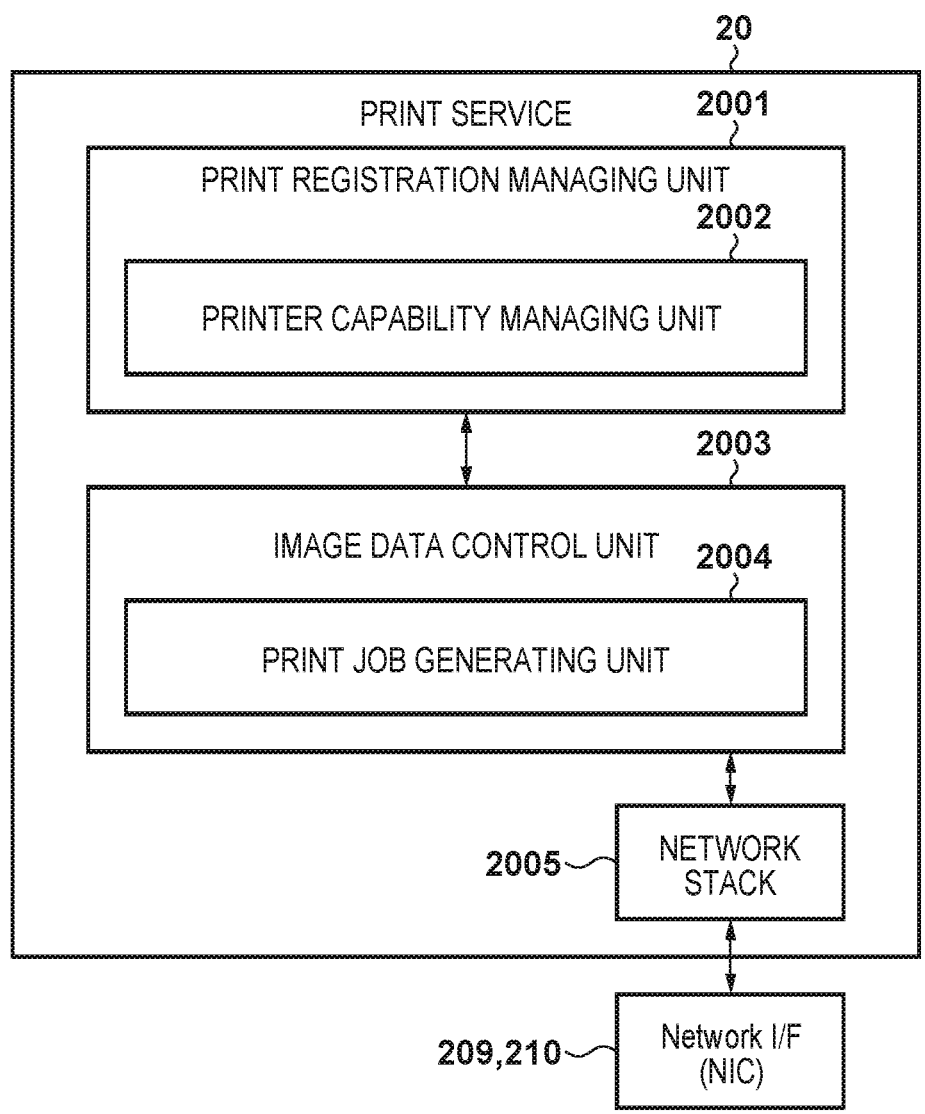
FIG. 5 is a block diagram for illustrating a software configuration of the cloud server 2 and the terminal 3 illustrated in FIG. 1.

FIG. 5 is a block diagram for illustrating a software configuration of a print service 20 provided by the cloud server 2. The print service 20 comprises a printer registration managing unit 2001 and an image data control unit 2003 are comprised. The print service 20 also comprises a module of a network stack 2005. Furthermore, the printer registration managing unit 2001 includes a printer capability managing unit 2002 that manages capabilities of each registered printer. Each module or task is configured, from programs, saved in the ROM 203, and, in the implementation, the programs are executed by being processed by the CPU 201.

Based on support information including formats of document data processable by the image forming apparatus 1 that is stored in the print registration managing unit 2001 and the printer capability managing unit 2002, the image data control unit 2003 instructs generation of a print job (hereafter, simply called a job) to a print job generating unit 2004. The network stack 2005 performs control of network protocols starting with transmission control protocol/internet protocol (TCP/IP), and including XMPP as well as HTTP, and, via the Internet 4, realizes communication with the image forming apparatus 1. The print job generating unit 2004 notifies the image forming apparatus 1 via the network I/F (NIC) 209 or 210 that there is a generated job, and executes a later-described cloud print sequence.

Cloud Print Sequence

Figure 6:
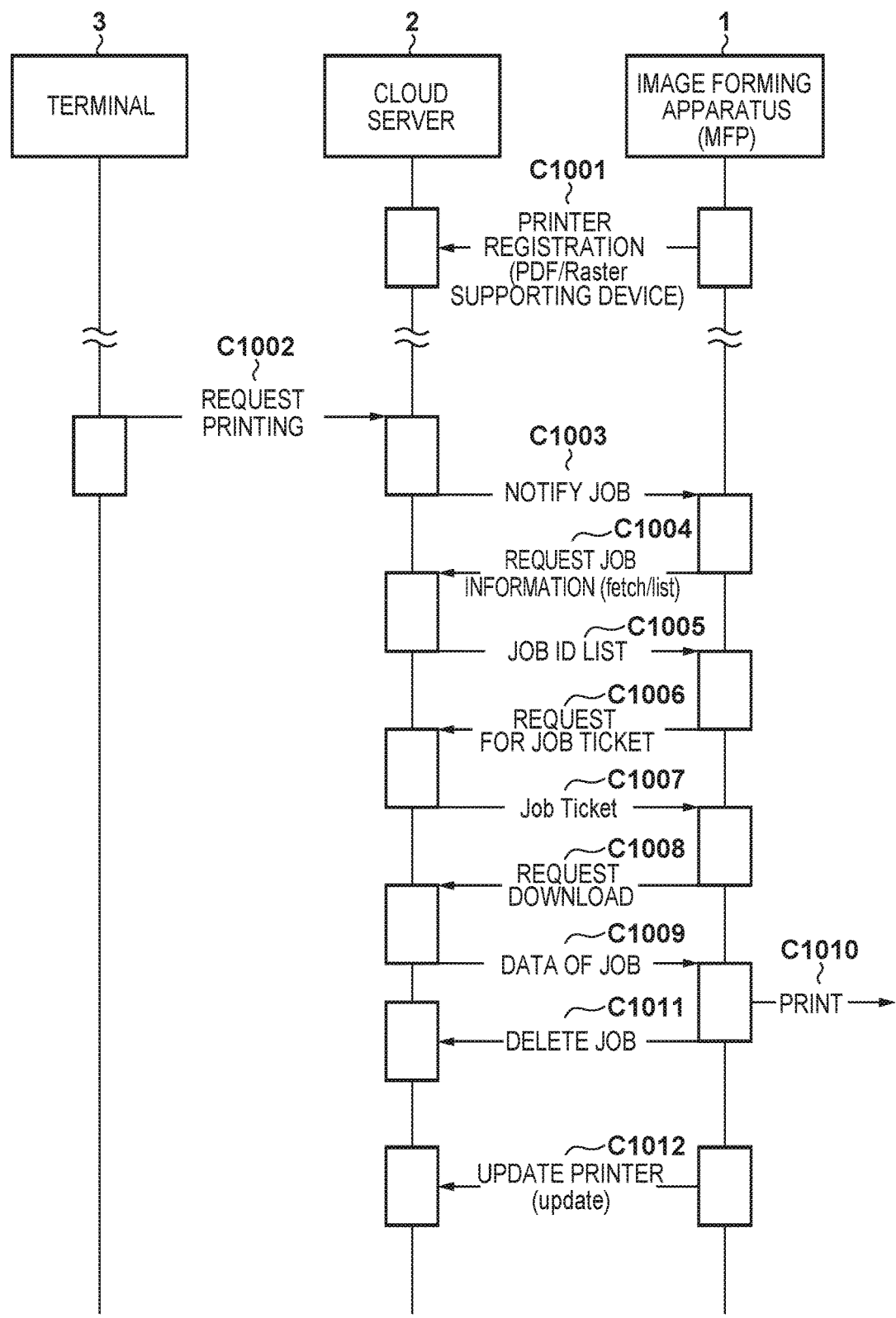
FIG. 6 is a view for illustrating one example of a general cloud print sequence.

FIG. 6 is a view for illustrating one example of a cloud print sequence according to the present embodiment. In particular, in the first embodiment, explanation is given of a cloud print sequence based on Google Cloud Print, which is published by Google®. In the cloud print service according to the present embodiment, a method in which capabilities that an image forming apparatus supports are registered in the cloud server 2 beforehand is used. Note that, in the present example, to explain based on Google Cloud Print, explanation is given using a particular format or protocol employed therein, but the invention according to the present embodiment may be executed by another cloud print service, and, in such a case, a format or protocol in accordance with that service is used. In addition, while the present embodiment in particular handles problems for when document data is in the PDF format, because a similar problem to that of PDF occurs for document data of a format for which processing cannot start if the entirety of the document data is not stored, it is also possible to apply the invention of present embodiment to such cases.

The image forming apparatus 1 of the present embodiment is in accordance with an operation of the UI 1001, and sends, to the cloud server 2, data in which capabilities and functions supported by the image forming apparatus 1 are described (processing of C1001 of FIG. 6). Capabilities of the image forming apparatus are described in a publicly known format, such as Extensible Markup Language (XML), or Javascript® Object Notation (JSON) Request for Comments (RFC) 4627. In addition, keywords expressing individual capabilities of a printer are predetermined, and using these keywords, it is possible to register capabilities, such as a supported image format or resolution. In the present embodiment, a configuration is taken such that support information is exchanged between the cloud server 2 and the image forming apparatus 1 in accordance with a JSON format exemplified by FIG. 10 and FIG. 11.

FIG. 10 is an example of capability data illustrating that the image forming apparatus 1 supports (in other words, can interpret and print) two formats of document data—a PDF format and a raster format. This capability data includes a print resolution. In FIG. 10, it is indicated that the image forming apparatus 1 supports document data of a PDF format and data of a PWG-Raster format and a resolution is 1200 dots per inch (dpi) for both vertical/horizontal. Also, in FIG. 11, it is indicated that the image forming apparatus 1 supports data of the PWG-Raster format only, and a resolution is 300 dpi for both vertical/horizontal. Such capability information is registered in advance to the print registration managing unit 2001 of the cloud server 2 from the image forming apparatus in C1001.

The terminal 3 requests printing by the image forming apparatus 1, which is registered beforehand, with respect to the cloud server 2 (C1002 recited in FIG. 6). Regarding designation of the image forming apparatus 1 used, configuration may be taken such that, for example, usable image forming apparatuses in the neighborhood of the image forming apparatus 1 are presented to the terminal 3 from the cloud server 2, and a user can designate by selecting from the image forming apparatuses. Regarding designation of document data that is a printing target, similarly, a configuration may also be taken such that document data that the cloud server 2 can provide is presented to the terminal 3, and it is possible to designate by a user by selecting from the image forming apparatuses.

The cloud server 2, having received the print request, generates a job in accordance with the request, and notifies by XMPP to the image forming apparatus 1, which has been selected from printers registered in the print registration managing unit 2001, that the job has been input (processing of C1003 of FIG. 6). XMPP is Extensible Messaging and Presence Protocol, which is an XML-based protocol for exchanging messages, or the like. At this point, from resolutions and data formats supported by the image forming apparatus 1, the cloud server 2 selects something for which output quality becomes high, and generates job data (or print data). If generated job data has already been stored, corresponding job data is selected therefrom. At a time of generating job data, if designation of quality, or the like, is included in the print request from the terminal 3, that designation may be complied with.

Upon being notified that a job has been input, the image forming apparatus 1 executes fetching a list of job IDs, in other words a job list (processing of C1004 of FIG. 6). Fetching means obtaining the job list from the cloud server 2. The job list includes at least the job identification (ID) and a size of each job, as well as a data format of each job. Note that, in addition to the job ID, the job list may include the job data of each job as well as information of a uniform resource locator (URL) that is a storage location of a job ticket, and such information is referred to as job information.

Having received the fetch request for the job, the cloud server 2 returns to the image forming apparatus 1 a list of job IDs that includes n job IDs, the size of each job, and the data format of each job. In other words the job list (processing of C1005 of FIG. 6).

Upon the job list being notified to the image forming apparatus 1, the image forming apparatus 1 of the present embodiment compares the size of each job and the storage capacity for storing document data of the image forming apparatus 1, and if the job size is less than or equal to the storage capacity, the image forming apparatus 1 makes a request to the cloud server 2 for a job ticket corresponding to a job ID (processing of C1006 of FIG. 6). This request is, for example, performed based on the URL of the job ticket, or the like.

With respect to this, the cloud server 2 returns the job ticket of the instructed job ID (processing of C1007 of FIG. 6). Similarly to the capabilities of the image forming apparatus, the job ticket is described by XML or JSON, and keywords are predetermined similarly to the image forming apparatus capability information.

Next the image forming apparatus 1 makes a request to the cloud server 2 for the job data of the job ID, in other words download of the document data (processing of C1008 of FIG. 6). Having received this, the cloud server 2 transmits the job data of the print job to the image forming apparatus 1 (processing of C1009 of FIG. 6).

Upon receiving the print job, the image forming apparatus 1 prints the job data in accordance with content instructed by the job ticket (processing of C1010 of FIG. 6). When printing of one job completes, the image forming apparatus 1 requests the cloud server 2 to delete the completed job, in other words a deletion instruction (or a deletion request) for the job (processing of C1011 of FIG. 6), and causes the print processing to terminate. Deletion of the job is generated based on the print request C1002, and data as the source of the job, such as the document data or the settings data, is, of course, not a deletion target. The image forming apparatus 1 repeats C1006 to C1011 for all jobs included in the job list.

As a result of comparing the size of each piece of job data with the storage capacity for the document data of the image forming apparatus 1, if the size of the job data is large, the image forming apparatus 1 updates in accordance with an update instruction (or an update request) with new capability information that causes the current capability information of the image forming apparatus 1 to be lowered. Upon receiving this update instruction, if a job with respect to the image forming apparatus 1, which is the transmission source, remains, the cloud server 2 generates the job again, and again transmits a job notification to the image forming apparatus 1 (step C1003). The image forming apparatus 1 repeats the above-described sequence in accordance with this job notification.

In addition, the image forming apparatus 1 can irregularly make a request to the cloud server 2, by an update instruction, that a state or capability of the image forming apparatus 1 is changed (processing of C1012 of FIG. 6). After receiving this update instruction, the cloud server 2 performs processing, such as changing the state of the image forming apparatus 1, for example registered capability information, and job generation suitable for the capabilities of the image forming apparatus 1, as described above.

Prior Registration by Image Forming Apparatus

Figures 7, 8:
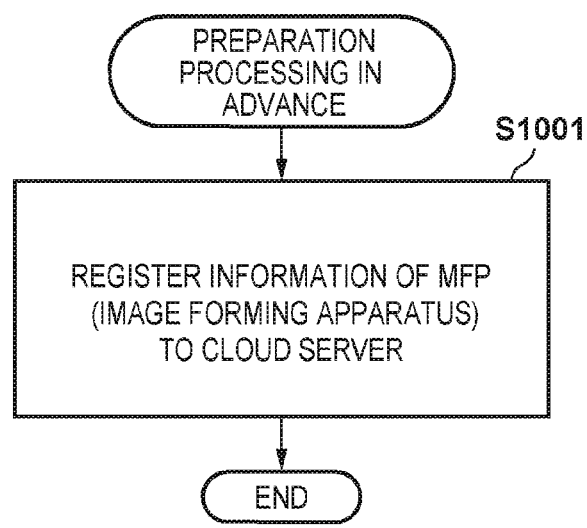
FIG. 7 is a view for illustrating a processing flow of a printer registration C1001 performed by the image forming apparatus 1 illustrated in FIG. 6.
FIG. 8 is a view for illustrating one example of a screen displayed in step S1001 illustrated in FIG. 7.

FIG. 7 is a flowchart that illustrates a method of registering in advance a capability supported by the image forming apparatus 1 in the cloud server 2 in the cloud print service that the present invention considers, and illustrates details of processing of C1001 of FIG. 6.

In step S1001 a print registration screen, such as that of FIG. 8, is displayed by the terminal 3, and a corresponding image forming apparatus 1 is selected. By this selection operation, registration of the selected image forming apparatus 1 is instructed from the terminal 3 to the cloud server 2. Based on this registration instruction, the cloud server 2 queries the image forming apparatus 1 for supported capabilities, and registers and holds the device information, such as an internet protocol (IP) address or a model name of the image forming apparatus 1, and capability information, such as a supported image format, in the print registration managing unit 2001 or the printer capability managing unit 2002 illustrated in FIG. 5.

Print Control Procedure by Image Forming Apparatus

Figure 9A:
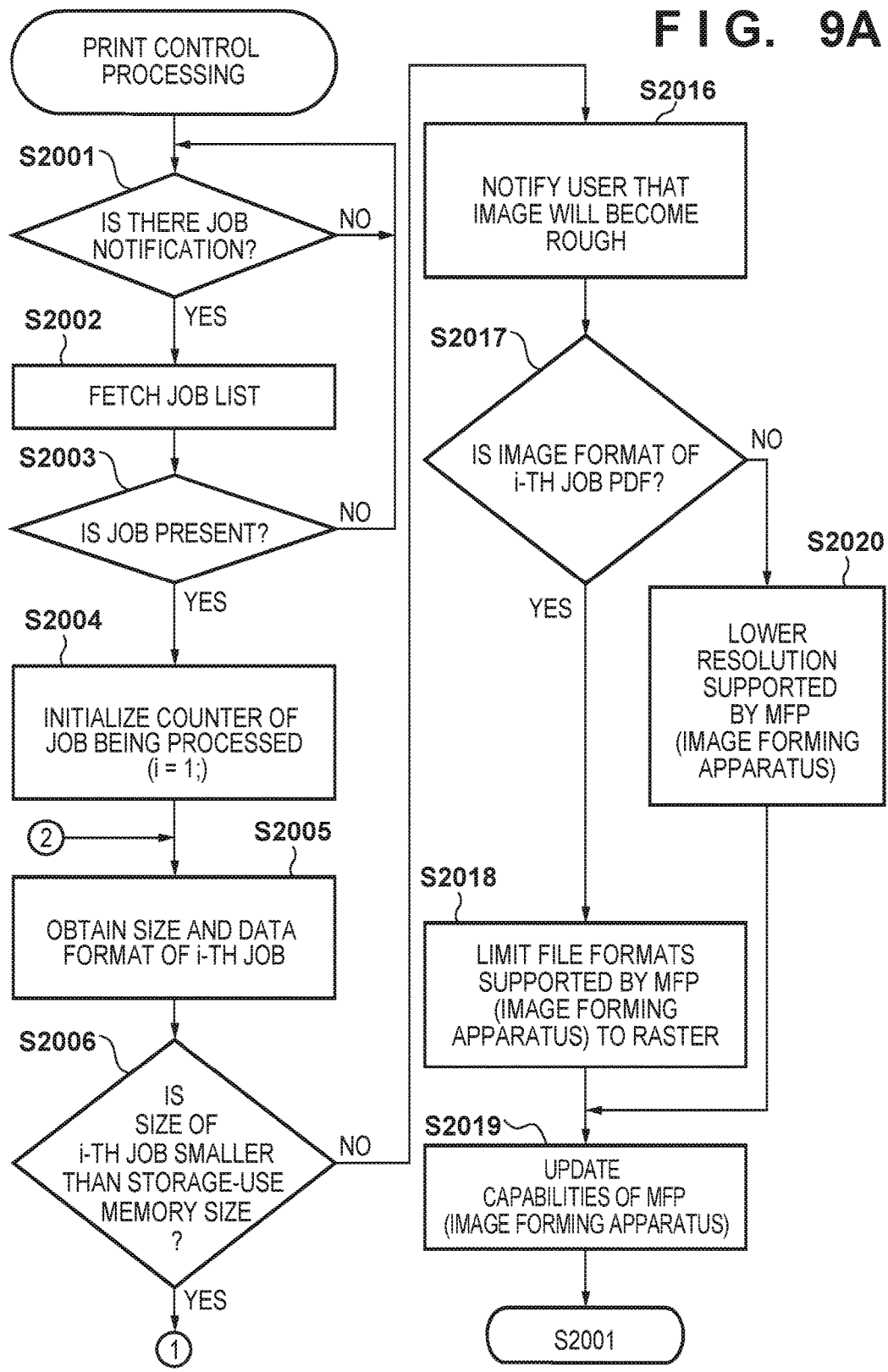
FIGS. 9A and 9B are flowcharts for illustrating a print control processing flow performed by the image forming apparatus 1 according to the present embodiment.
Figure 9B:
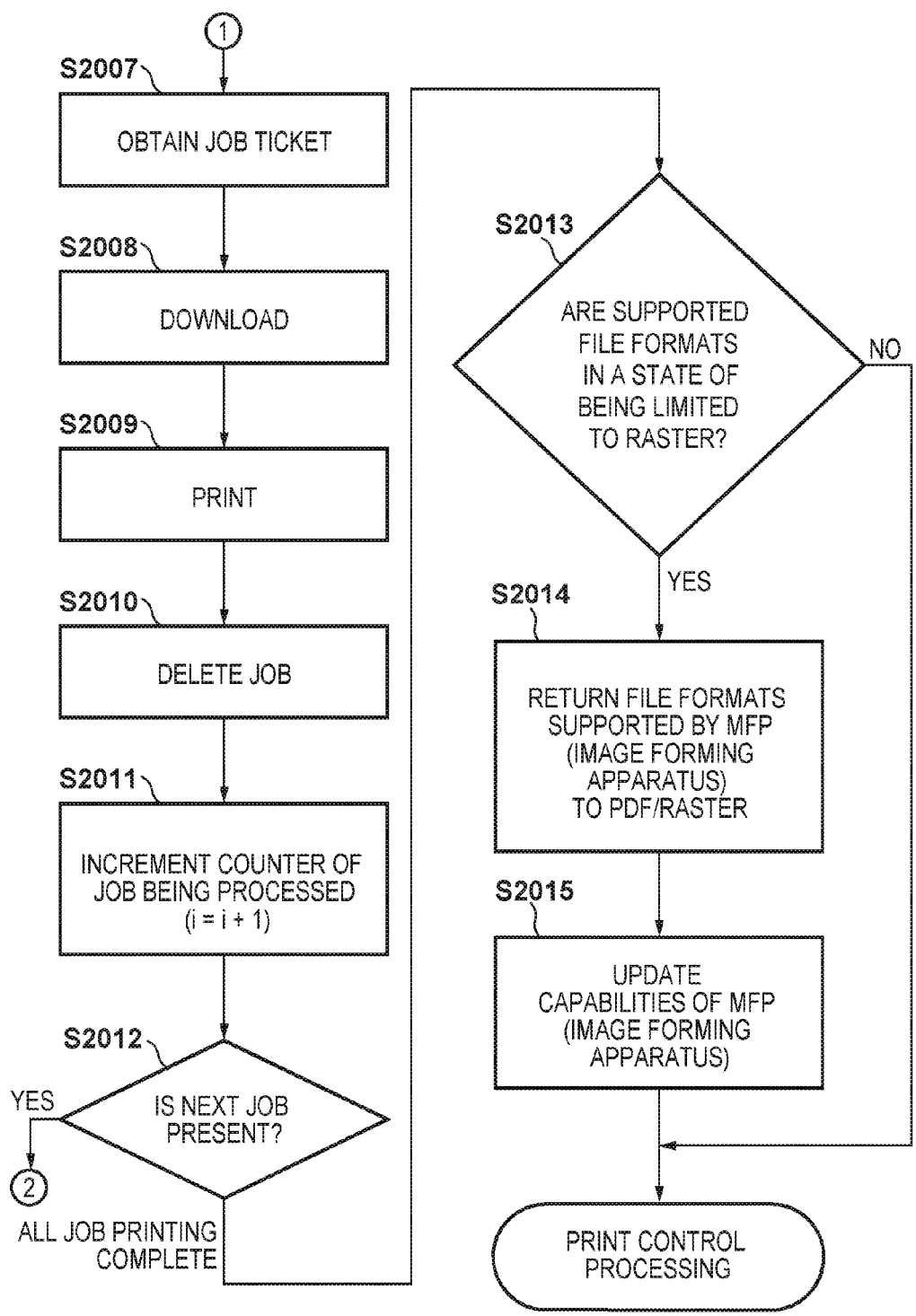

FIGS. 9A and 9B show a flowchart for illustrating a print control processing flow in the present embodiment. The processing of FIGS. 9A and 9B is processing realized by the CPU 101 executing a program that configures the cloud print 1003 described in FIG. 4. In the present invention, control by the job controller 1002 is envisioned. In a cloud print service envisioned by the present invention, as explained in FIG. 6, printer capabilities must be registered in advance to the cloud server 2 (corresponding to C1001 of FIG. 6). Thereafter, an instruction to print is made from the terminal 3 to the cloud server 2 (corresponding to C1002 of FIG. 6), and after converting data to a format that the image forming apparatus 1 supports in the cloud server 2, and generating a job, a print instruction is made to the image forming apparatus 1 (corresponding to C1003 of FIG. 6).

Firstly, in step S2001, the image forming apparatus 1 waits for notification of a job generation from the cloud server 2 to the image forming apparatus 1 (corresponding to C1003 of FIG. 6). The notification of the job is sent to the job controller 1002 through the network stack 1004 described in FIG. 4. When the job notification is detected in step S2001, the processing proceeds to step S2002.

In step S2002, fetching of the list of the job IDs, in other words the job list, is executed. Fetching means obtaining the job list from the cloud server 2. Information indicating at least a job ID, a format, and a size of the job data is included in this job list. Note that, in addition to the job ID, the job list may include the job data of each job as well as information of a URL, which is a storage location of a job ticket, and such information is referred to as job information. FIG. 12 illustrates such an example. In the example of FIG. 12, one job with a job ID of 0001, a format (type) of PDF, a size of 33888, and a job name of PrintDoc.pdf is illustrated, and further, a URL that is a storage location is illustrated. In step S2002, when the job fetch request is transmitted from the image forming apparatus 1 to the cloud server 2 (C1004 of FIG. 6), the cloud server 2, having received the request, returns a list of job IDs, in other words a job list, that include n (n is 1 or more) job IDs to the image forming apparatus 1 (corresponding to C1005 of FIG. 6). Ordinarily, a list of job IDs, immediately after printing of one job is requested, lists one (n=1) job ID (refer to FIG. 12). During later-described print processing of the job, or if printing of a separate job is requested while the job is suspended, there may be more than one job ID (n>1). In step S2002, an obtained list of job IDs, i.e. a job list, is temporarily stored in the RAM 102 described in FIG. 2.

In step S2003, it is determined whether the stored job ID list is empty. If empty, the processing returns to step S2001. Conversely, if one or more IDs are listed in the stored job ID list, the processing proceeds to step S2004.

In step S2004, an index i is set to 1. A job of interest is indicated by the index i. The steps S2006 to S2020 are executed for the job of interest. Continuing, in step S2005, a format of the job data indicated by "job_type" and a data size indicated by "job size" of an i-th job in the job list (i.e., the job of interest) are retrieved from the information (FIG. 12) of the job IDs temporarily stored in step S2002.

Next, in step S2006, whether the data size (data indicated by "job size" in FIG. 12) obtained in step S2005 will fit into (is smaller than) a job data storage-use memory that the image forming apparatus 1 has is confirmed. Here, if it can be confirmed that the data size can be processed, the processing proceeds to step S2007. The job data storage-use memory is a memory or memory area that is used for storing a job data.

In step S2007, a job ticket of the i-th job ID included in the data format list is obtained. Here, the image forming apparatus 1 issues, based on the URL of the job ticket in the job list, a job ticket request for the i-th job ID to the cloud server 2 (corresponding to C1006 of FIG. 6). With respect to this job ID, the cloud server 2 returns the job ticket of the instructed job ID (corresponding to C1007 of FIG. 6). Similarly to the capability information of the image forming apparatus 1, the job ticket is described by XML or JSON, and keywords are predetermined similarly to the image forming apparatus capability information (one example of a job ticket is illustrated in FIG. 13).

In step S2008 a request is made to the cloud server 2 for download of the job data of the job ID (corresponding to C1007 of FIG. 6). Having received this the cloud server 2 returns the job data to the image forming apparatus 1 (corresponding to C1008 of FIG. 6).

In step S2009, the received job data is printed (corresponding to C1009 of FIG. 6). When the printing completes the processing proceeds to step S2010, and an instruction to delete the job for which printing has completed, i.e. deletion of the job, is requested to the cloud server 2 (corresponding to C1010 of FIG. 6). In accordance with the deletion request, the cloud server 2 deletes the job.

Next the processing proceeds to step S2011, 1 is added to the index i, and the processing proceeds to step S2012. By deleting in step S2010 the job for which printing completed, it means that a job list obtained subsequently does not include the deleted job.

In step S2012, whether an unprocessed job ID is present in the job ID list temporarily stored in step S2002 is investigated. If a plurality of job IDs are listed, step S2005 to step S2012 are repeatedly executed until processing of all job IDs completes. If it is confirmed that all job IDs are complete, the processing proceeds to step 2013.

Meanwhile, if, in step S2006, the image data size (data indicated by "job_size" in FIG. 12) obtained in step S2005 is determined to be greater than the image-storage-use memory that the image forming apparatus 1 has, the processing proceeds to step S2016.

In step S2016, that "there is a possibility that the image will degrade" (not shown) is output to the UI 1001 of FIG. 4 to notify a user. For a method of notification to a user, for example a message indicating a possibility of image degradation may be displayed on the console unit 110 of the image forming apparatus 1, and the message may be transmitted to an issuing source of the print request, for example the terminal 3, and is caused to be displayed there in the console unit. The transmission to the terminal 3 may be via the cloud server 2, or may be performed directly. Next, in step S2017, a data format indicated by "job_type" of the i-th job is retrieved from the information (FIG. 12) of the job IDs temporarily stored in step S2002. If "pdf" is present in the data format, the processing proceeds to S2018, and support information that temporarily removes PDF from the image format is generated (one example is illustrated in FIG. 11). By excluding PDF for which the size can become large, it can be expected that the size of the regenerated job data will be caused to be reduced.

In contrast, in step S2017, if "PDF" is not present, the processing proceeds to step S2020, and capability information, which causes the resolution supported to be lowered, is generated. Making the resolution go down is performed, for example, by sequentially lowering from a high resolution that the image forming apparatus 1 supports to a low resolution. For example, if the registered capability information is 1200 dpi and resolutions supported by the image forming apparatus 1 are 1200, 600, 300, or 150 dpi, capability information that has a resolution of 600 dpi is generated next. By lowering the resolution, reducing the size of regenerated job data can be expected.

Thereafter, the processing proceeds to S2019, the support information updated in S2018 or step S2020 is sent to the cloud server 2, and an update instruction to update capabilities of the image forming apparatus 1 is made. After this, the processing returns to step S2001.

In the present embodiment, by the cloud server 2 receiving the update instruction, the job is regenerated in accordance with an image format supported by the image forming apparatus 1. For example, if a job generated to be output from the image forming apparatus 1, which is the transmission source of the update instruction, remains, for the remaining job the cloud server 2, having received the update instruction, converts the document data in accordance with the newly updated capability information to generate the job. A job notification is then transmitted to the image forming apparatus 1. In step S2001, the image forming apparatus 1 receives the job notification for the job that is regenerated in accordance with the capability information accompanying the update instruction. Thereafter, the above-described procedure is repeated from step S2001.

In step 2013, it is confirmed whether the functions of the image forming apparatus 1 were temporarily lowered by step S2018 or step S2020. Here, if there was a temporary function lowering, the processing proceeds to step S2014, and the capability information of the image forming apparatus 1 registered in step S1001 is returned. Thereafter, in step S2015 an update command for updating apparatus capabilities is issued from the image forming apparatus 1 to the cloud server 2. In accordance with receiving the update command, the loud server 2 executes an update process for information registered in the printer capability managing unit 2002 or the print registration managing unit 2001 illustrated in FIG. 5.

By configuring a system as described above, the image forming apparatus 1 of the present embodiment can obtain job data corresponding to capabilities by a simple process. In comparison to the prior art, by temporarily causing a function of an image forming apparatus to be lowered, it is possible to reduce an image data amount that is handled, and it becomes possible to print by a simple operation without complicated operation.

Note that in the example described above, a method was given by which a job is generated in accordance with a highest capability out of capability information registered on an image forming apparatus, but a method by which the cloud server 2 performs in advance job generation in all formats that the image forming apparatus 1 supports may be used. In such a case, a configuration may be taken such that, if the content of the update instruction, for example, stops at the deletion of a supported format, the job is not regenerated in accordance with the update instruction of step S2019, and the cloud server 2 can immediately respond with a job notification. In the job list transmitted to the image forming apparatus 1, however, a job, generated in advance, of a format supported after the update of the capability information is displayed.

Second Embodiment

In the first embodiment, explanation was given, for example, of a configuration comprising the image forming apparatus 1, the cloud server 2, and the terminal 3. It is possible to easily envision, however, that improvement of the capabilities of the terminal 3 will advance, and functions equal to those of the cloud server 2 will be supported by the terminal 3. Here, explanation is given of an embodiment for when a print service is realized with just the image forming apparatus 1 and the terminal 3, and without the cloud server 2. In the present embodiment, compared to the first embodiment, the configuration differs in a point in that the terminal 3 has the print service 20 built-in. For this, the image forming apparatus 1 performs a cloud print process with the print service 20 of the terminal 3 as the cloud server 2 in the first embodiment. The procedure is explained below.

Figure 14:
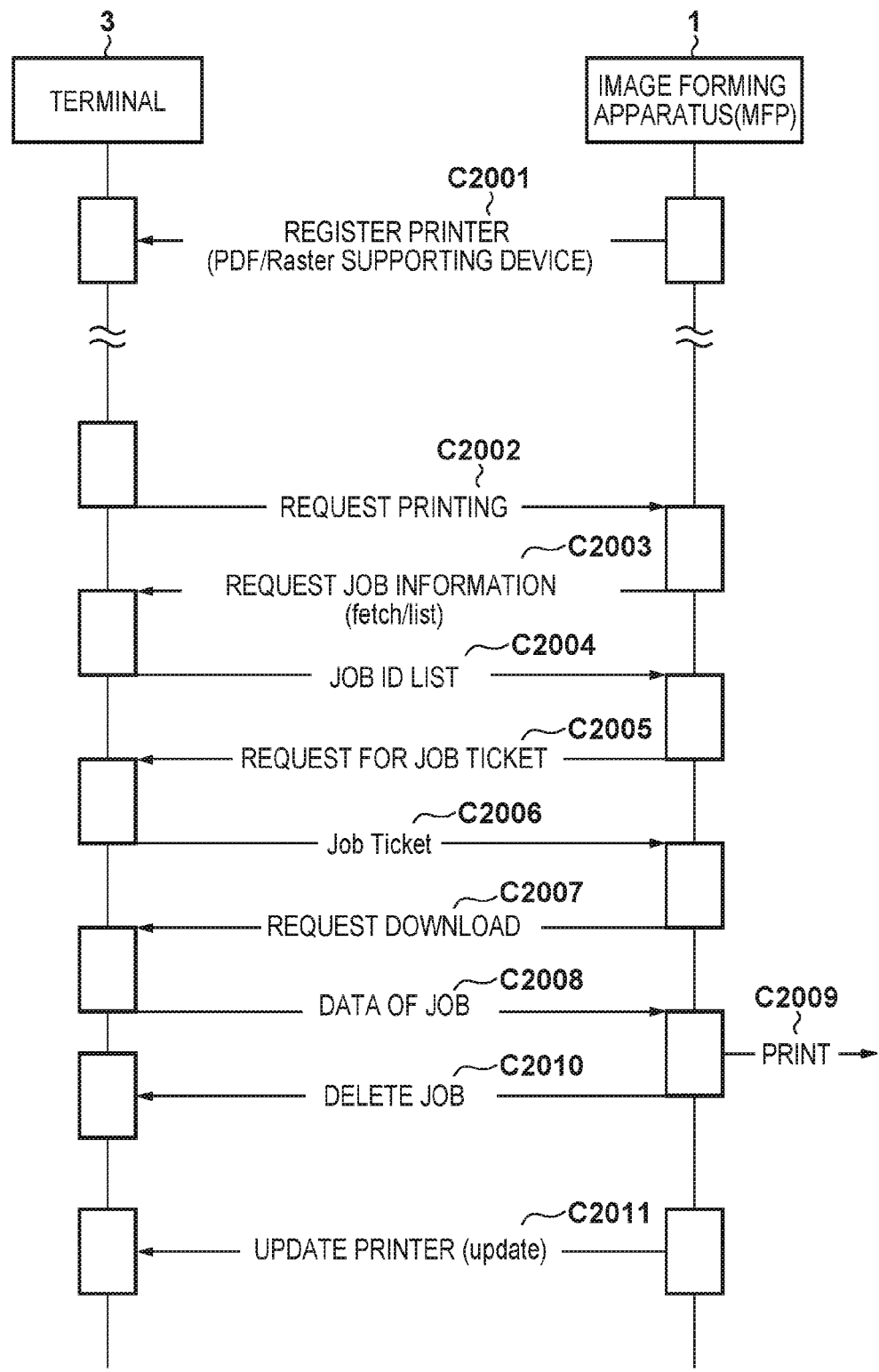
FIG. 14 is a view for illustrating a second embodiment of the present invention.

With reference to FIG. 14, the terminal 3 registers, in advance, capability information, or the like, of the image forming apparatus 1 (C2001 described in FIG. 14). The capabilities of the image forming apparatus 1 are similar to the content indicated in the first embodiment, and are described in a publicly known format, such as XML or JSON. In addition, keywords expressing individual capabilities of a printer are predetermined, and using these keywords, it is possible to register capabilities such as a supported image format or resolution.

Next, the terminal 3 requests printing with respect to the registered image forming apparatus 1 (C2002 described in FIG. 14). Similarly to the content indicated in the first embodiment, a print request is also uses a protocol such as XMPP.

The image forming apparatus 1 to which the print request is made executes fetching of a list of job IDs, in other words a job list (processing of C2003 of FIG. 14). Similarly to the first embodiment, the job list also includes at least a job ID, and also includes information of a URL, which is a storage location of a job ticket, or the like.

Having received the fetch request for a job, the terminal 3 returns a list of job IDs, i.e. a job list, that includes n job IDs to the image forming apparatus 1 (C2004 of FIG. 14).

When the job list is notified to the image forming apparatus 1, a job ticket is requested based on the URL of the job ticket corresponding to the job ID (processing of C2005 of FIG. 14).

With respect to this, the terminal 3 returns the job ticket of the instructed job ID (processing of C2006 of FIG. 14). Similarly to in the first embodiment, the job ticket is described by XML or JSON, and keywords are predetermined similarly to the image forming apparatus capability information.

The image forming apparatus 1 makes a request to the terminal 3 for downloading the job data of the job ID (processing of C2007 of FIG. 14). Having received this download request, the terminal 3 transmits a print job to the image forming apparatus 1 (processing of C2008 of FIG. 14).

Upon receiving the print job, the image forming apparatus 1 prints in accordance with content instructed by the job ticket (processing of C2008 of FIG. 14). When printing completes, the image forming apparatus 1 sends a request for deletion of the completed job, i.e. a deletion instruction for the job, to the terminal 3 (processing of C2010 of FIG. 14) and print processing is caused to terminate.

Here, a determination of whether the job information received in C2004 is 1 greater than or less than the storage-use memory size of the image forming apparatus 1 is performed similarly to step S2006 of FIGS. 9A and 9B. If the job information size is greater, a temporary function lowering is processed similarly to processing from step S2016 to step S2019 of FIG. 9A.

Furthermore, in accordance with whether S2018 or step S2020 of FIG. 9A have operated, it is possible to similarly return capabilities of the image forming apparatus 1, for which a temporary function lowering was caused, to an original state by step S2014 and step S2015.

In the present embodiment, a method is given in which, by the terminal 3 receiving the update instruction (processing of C2011 of FIG. 14), a job is regenerated in an image format that the image forming apparatus 1 supports, but a method may be used in which the terminal 3 performs job generation in advance in all image formats that the image forming apparatus 1 supports.

Furthermore, in the present embodiments, explanation was given by configurations between the image forming apparatus, the cloud server, and the terminal, as well as between the image forming apparatus and the terminal, but the terminal may have a configuration that uses a personal computer, or the like, and is not particularly limited.

By the arrangement explained above, for a job that exceeds a memory capacity supported by an image forming apparatus, by causing a function, such as a resolution or a file format supported by the image forming apparatus to be lowered, it is possible to automatically reduce a capacity of a job. For this reason, it becomes possible to also print jobs that conventionally would have received a job cancellation.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus communicable with a server and having an image forming unit to print an image from a print job on a sheet, the image processing apparatus comprising:
(A) a memory that stores instructions; and
(B) a controller having a processor that executes the instructions to function as:
(a) an obtaining unit configured to obtain, from the server, (i) a print job including, print data (ii) data size information of print data, the data size information not including print data in a Portable Document Format (PDF) format, and (iii) size information of the print job, the size information not including, print data of the print job; and
(b) a notification unit configured:
(i) to initially provide a notification indicating that both of a PDF format and a format that is different front the PDF format are supported, wherein the image processing apparatus waits for receipt of complete pint data of a print job in the PDF format before performing image processing, and d w image processing apparatus is capable of starting the image processing before receipt of complete print data of a pint job in the format that is different from the PDF format; and
(ii) to provide, after obtaining the data size information, an updated notification to the server in a case in which the obtained date size information indicates a data size that is greater than a predetermined size, wherein the updated notification than is used to identify that the PDF format is not supported, but a format that is different from the PDP format is supported, wherein the image processing apparatus is capable of starting the image processing before receipt of the complete data of the print job in the format that is different from the PDF format,
wherein the notification unit provides a notification indicating that both of the PDF format and the format that is different from the PDF are supported again, after the notification unit provides the updated notification to the server, in a case in which the obtained data size information indications a data size that is greater that the predetermined size, and after printing the image from the print job.

2. The image processing apparatus according to claim 1, wherein the processor of the controller is further configured to execute the instructions to function as (c) a transmission request unit configured to request transmission of the print data in the PDF format from the server based on the data size information that indicates that the data size of the print data in the PDF format is equal to or less than the predetermined size.

3. The image processing apparatus according to claim 1, wherein the processor of the controller, functioning as the obtaining unit, is further configured to obtain information indicating a storage location for the print data in a PDF format from the server, together with the data size information of the print data in the PDF format generated based on a specific document.

4. The image processing apparatus according to claim 1, wherein the notification unit is further configured (iii) to notify the server that a plurality of formats, including at least the PDF format and the format that is different from the PDF format, are supported according to an image forming process, based on the print data in a format that is different from the PDF format.

5. The image processing apparatus according to claim 1, wherein the predetermined size is based on a data size of print data that can be stored in a memory for storing the print data.

6. The image processing apparatus according to claim 1, wherein the print data in the PDF format is data generated by the server based on a specific document.

7. The image processing apparatus according to claim 1, wherein the format that is different from the PDF format is a raster format.

8. A control method of controlling an image processing apparatus communicable with a saver and using an image forming unit to print an image from a print job on a sheet, the apparatus comprising a controller having a processor that executes instructions stored in a memory to perform the control method, the control method comprising:
executing a process for obtaining, from the server, (i) a print job including print data, (ii) data size information of the print data, the data size information not including print data in a Portable Document Format (PDF) format, and (iii) size information of the print job, the size information not including print data of the print job;

initially providing a notification indicating that both of a PDF formal and a format that is different from the PDF format are supported, wherein the image processing apparatus waits for receipt of complete print data of a print job in the PDF format before performing image processing, and the image processing apparatus is capable of starting the image processing before receipt of complete print data of a print job in the format that is different from the PDP format;

providing, after obtaining the data size Information, an updated notification to the server in a case in which the obtained data size information indicates a data size that is greater than a predetermined size, wherein the update notification is used to indicate that the PDF format is not supported, but the format that is different from the PDF format is supported, to the server, wherein the image processing apparatus is capable of stating the image processing before receipt of the complete data of the print job in the format that is different from the PDF format; and providing a notification indicating that both of the PDF format and the format that is different from the PDF are supported again, after the updated notification is provided to the server, in a case in which, the obtained data size information indicates a data size that is greater than the predetermined size, and after printing the image from the print job.

9. The control method according to claim 8, further comprising requesting transmission of the print data in the PDF format from the server based on the data size information that indicates that the data size of the print data in the PDF format is equal to or less than the predetermined size.

10. The control method according to claim 8, further comprising obtaining information indicating a storage location for the print data in the PDF format from the server, together with the data size information of the print data in the PDF format generated based on a specific document.

11. The image processing apparatus according to claim 8, further comprising notifying the server that a plurality of formats, including at least the PDF format and the format that is different from the PDF format, are supported according to an image forming process based on the print data in a format that is different from the PDF format.

12. The image processing apparatus according to claim 8, wherein the predetermined size is based on a data size of print data that can be stored in a memory for storing the print data.

13. The image processing apparatus according to claim 8, wherein the print data in the PDF format is data generated by the server based on a specific document.

14. The control method according to claim 8, wherein the format that is different from the PDF format is a raster format.

15. An image forming system comprising:
(A) an image processing apparatus; and
(B) a server configured to communicate with the image processing apparatus, the server including:
  (a) a memory that stores instructions; and
  (b) a server controller having a processor that executes the instructions stored on the memory to function as:
    (i) a transmitting unit configured to transmit data size information of print data in a Portable Document Format (PDF) format generated based on a specific document, based on information indicating that the image processing apparatus supports at least the PDF format; and
    (ii) an obtaining unit configured to obtain a print job including print data, and data size information that (1) includes print data in a format that is different from the PDF format, and (2) is generated based on the specific document, based on information indicating that the image processing apparatus does not support the PDF format, but does support the format that is different from the PDF format,
wherein the image processing apparatus comprises:
  (a) a memory that stores instructions; and
  (b) an apparatus controller having a processor that executes the instructions to function as:
    (i) an obtaining unit configured to obtain, from the server, the print job and the data size information of the print data, the data size information not including the print data in the PDF format; and
    (ii) a notification unit configured:
      (1) to initially provide a notification indicating that both of a PDF format and a format that is different from the PDF format are supported; and
      (2) to provide, after receiving the data size information, an updated notification to the server in a case in which the obtained data size information indicates a data size that is greater than a predetermined size, wherein the updated notification indicates that the PDF format is not supported, but the format that is different from the PDF format is supported.

* * * * *